(12) United States Patent
Lau

(10) Patent No.: US 7,035,938 B2
(45) Date of Patent: Apr. 25, 2006

(54) DETERMINATION OF CONNECTION LINKS TO CONFIGURE A VIRTUAL PRIVATE NETWORK

(75) Inventor: Chi Leung Lau, Morganville, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 746 days.

(21) Appl. No.: 09/732,442

(22) Filed: Dec. 7, 2000

(65) Prior Publication Data
US 2002/0112074 A1 Aug. 15, 2002

(51) Int. Cl.
G06F 15/173 (2006.01)
H04L 12/28 (2006.01)

(52) U.S. Cl. ............... 709/241; 709/249; 370/397

(58) Field of Classification Search ............ 709/241, 709/249, 238, 240; 370/397, 398, 409, 389, 370/390; 714/4, 43, 37
See application file for complete search history.

(56) References Cited

U.S. PATENT DOCUMENTS

| | | | | |
|---|---|---|---|---|
| 5,583,860 A | * | 12/1996 | Iwakawa et al. ............ 370/232 |
| 5,854,903 A | * | 12/1998 | Morrison et al. ........... 709/249 |
| 5,870,564 A | * | 2/1999 | Jensen et al. ............... 709/241 |
| 6,240,463 B1 | * | 5/2001 | Benmohamed et al. ..... 709/238 |
| 6,363,053 B1 | * | 3/2002 | Schuster et al. ............ 370/230 |
| 6,449,641 B1 | * | 9/2002 | Moiin et al. ................ 709/220 |
| 6,470,022 B1 | * | 10/2002 | Rochberger ............... 370/395.2 |
| 6,584,071 B1 | * | 6/2003 | Kodialam et al. .......... 709/241 |
| 6,633,544 B1 | * | 10/2003 | Rexford et al. ............. 370/238 |
| 6,661,797 B1 | * | 12/2003 | Goel et al. ............. 370/395.21 |
| 6,681,232 B1 | * | 1/2004 | Sistanizadeh et al. .... 707/104.1 |
| 6,778,531 B1 | * | 8/2004 | Kodialam et al. .......... 370/390 |
| 6,778,535 B1 | * | 8/2004 | Ash et al. ............. 370/395.21 |

OTHER PUBLICATIONS

U.S. Appl. No. 60/209,802.*
J. Y. Yen, "Finding the K Shortest Loopless Paths in a Network", Management Science, vol. II (1971), pp. 712-716.

* cited by examiner

Primary Examiner—Jeffrey Pwu
(74) Attorney, Agent, or Firm—Joseph Giordano; James W. Falk

(57) ABSTRACT

A technique for physically implementing a network of nodes in a virtual private network. To physically set-up all required connections in the network, a heuristic link selection algorithm is devised to systematically and efficiently determine interconnection links that realize the virtual private network subject to service level agreement requirements.

9 Claims, 4 Drawing Sheets

DETERMINATION OF CONNECTION LINKS TO CONFIGURE A VIRTUAL PRIVATE NETWORK

BACKGROUND OF THE DISCLOSURE

1. Field of the Invention

This invention relates generally to the configuration of a complex nodal-type network and, more particularly, to a methodology for heuristically selecting, subject to given constraints, links interconnecting network nodes to thereby configure the network.

2. Description of the Background Art

Conceptually, a Virtual Private Network (VPN) is characterized by a set of connections among N nodes. The connections may assume any topology such as full-mesh, partial-mesh, or stars. The connections may be uni-directional, bi-directional, point-to-point or point-to-multipoint, symmetric or asymmetric. VPN connections are usually associated with a set of performance requirements typically summarized in a service level agreement (SLA). Given a VPN request by a customer, specified by a SLA, the VPN service-planning task involves finding network resource necessary to fulfill the VPN-SLA requirement. In this context, network resource is defined to be a set of links chosen for the realization of the requested VPN connections.

In a practical network, such as an ATM network or an IP MPLS network, multiple links normally exist between two nodes of such networks. Algorithms exist for finding the most efficient links satisfying a set of SLA requirements. An example of such an algorithm can be found in an article entitled "Finding the K Shortest Loopless Paths in a Network", by J. Y. Yen, Management Science, 11 (1971), pages 712–716.

However, the problem for planning VPN is more involved due to the simultaneous requirement of a set of connections among N points. Suppose a VPN has connections 1, 2, . . . C. Suppose the VPN planner (which can be a software) attempts to find the optimum path, that is, a set of links (dependent on certain global criteria to be discussed later) connecting a given one of the N points with another one of the N points sequentially for connections 1, 2, 3 . . . . It is assumed that the first connection path is found by using the method described in the reference cited above. Next, the planner proceeds to find an optimum path for connection 2. By selecting a path to realize connection 2, the planner inevitably changes the available network resource and therefore the network state. This change upsets the optimum conditions for the previously selected path 1 and renders such selection non-optimum. This simple illustration of the so-called "sequential approach" suggests that a global optimal solution cannot be obtained by a straightforward sequential application of the same algorithm that produces an optimal solution for a single connection. Of course, an exhaustive search of every possible combination of all the k paths for all the C connections will theoretically yield the optimum solution. Such approach, however, would be prohibitively time-consuming and computationally-consuming (non-polynomial time).

Thus, a need exists in the art for a systematic procedure to configure a complete VPN given a specified SLA. As part of this procedure, it is necessary to obtain a tractable, effective solution that gives "close-to-optimum" results with negligible computational effort. "Close-to-optimum" means that the search result determines a feasible global minimum.

SUMMARY OF THE INVENTION

These shortcomings and other limitations and deficiencies are obviated in accordance with the present invention by a method, and concomitant circuitry, to systematically and efficiently determine interconnection links so as to configure a general network composed of switching nodes into a VPN network subject to the service level agreement requirements.

In accordance with the broad aspect of the present invention, a method is set forth for physically implementing a network of nodes interconnected by links subject to known constraints. The method includes the steps of (1) systematically selecting, based upon a prescribed mathematical algorithm, links interconnecting node pairs, the algorithm being determined to satisfy the requirements of a given service level agreement; and (2) interconnecting each node pair with the corresponding selected links.

In accordance with the system aspect of the present invention, a network manager, coupled to each of the nodes via a local controller associated with each of the nodes, computes the prescribed mathematical algorithm to obtain configuration information, and then transmits the configuration information to the nodes via the controllers, whereupon each node is arranged in correspondence to the configuration information. Traffic is routed to end-point nodes via the configured network.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

After considering the following description, those skilled in the art will clearly realize that the teachings of this invention can be readily utilized in providing a VPN subject to a SLA.

Overview of VPN Planning Algorithm

For illustrative purposes, we first consider a VPN with capacity as the only requirement comprising the SLA. Later, we will extend the method to cover other common SLA metrics (delay, loss, jitter).

The following terminology is used in the sequel:

(a) VPN has N end points. Each pair of end-points may constitute a connection. Therefore, a fully meshed VPN has a total of C=N(N−1) connections.

(b) For each connection, there may exist k or less shortest paths with the largest number of links (or, synonymously, hops) equals L, wherein (i) a path is a set of links connecting two end-points, and (ii) a link is a physical or logical connection between two nodes. Also, in the sequel, k paths implies k or less paths with no other paths that have less hops than L.

(c) A mini-max path is one of the k paths whose maximum capacity link is the minimum among the maximum-capacity links of the k paths.

(d) A global criterion (metric) is a property of the entire network. Examples are mini-max link capacity, or total minimum number of traversed links. Local criterion, on the other hand refers to a property of a particular path of a connection.

(e) A capacity matrix H(node,node,connection,k-path), corresponding to a hypothetical network, is a 4-dimentional matrix which represents the capacity assignment of the network. A capacity matrix can have capacity assignment from 1 or more connections. An H matrix is said to be SLA-enabled if all the SLA requirements are met.

The goal of optimization of resources is to be able to fit as many VPNs into a network of finite capacity. However, since VPN requirements may come in various forms, there is no easy way to define what is an optimal allocation. Examples of criteria include minimum hops (or shortest path), or minimum delay. Taking into account SLA metrics including packet loss and delay, one common criterion is load balancing. With respect to load balancing, one strives to allocate network resources in such a way that the maximum load on any link is minimized. There are different measures (metrics) for achieving load balancing. Examples are mini-max, mini-xth percentile, which means that the largest x-th percentile of the allocated capacity is to be minimized, mini-mean, or mini-standard deviation. In the following, the method is based upon the mini-max criterion. However, the heuristic algorithm which is now described is applicable to all the other global criteria or combination of these criteria.

Figure 1:
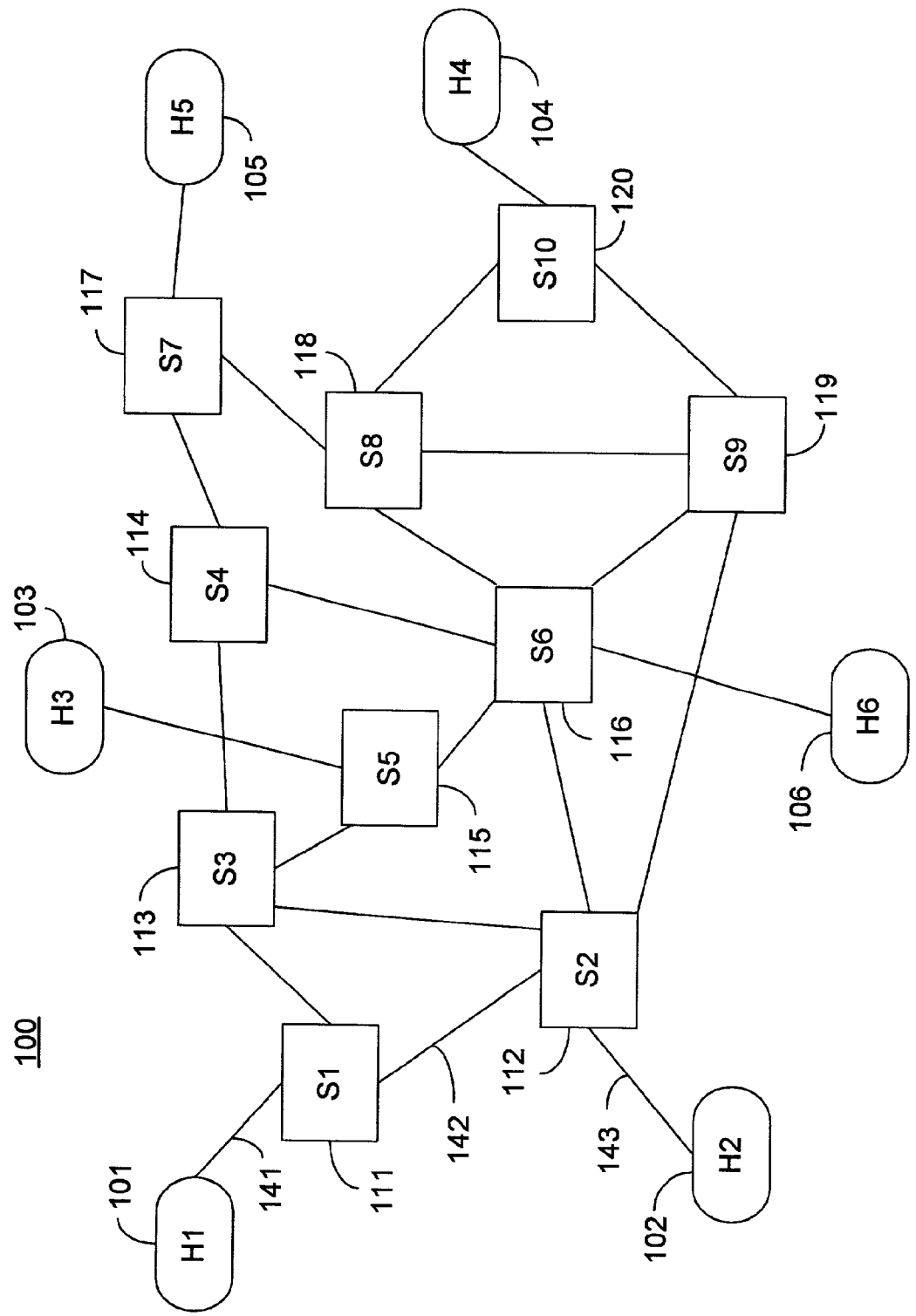
FIG. 1 illustrates an illustrative network to be configured as a VPN subject to a service level agreement.

The starting point is the assumption that k shortest paths for each connection can be obtained. The devised technique is illustrated with reference to VPN network 100 in FIG. 1, with summary information set forth in Table 1. Network 100 is composed of six VPN end-points H1, H2, . . . , H6, labeled 101–106, respectively, and ten switching nodes S1, S2, . . . , S10, labeled 121–130, respectively. The total number of VPN connections is 30 (i.e., C=N(N−1)=6(6−1)= 30). Also shown in FIG. 1 is a representative set of links 141, 142, and 143; one exemplary path from H1 to H2 is composed of these three links, which are shown explicitly in Table 1—other links composing paths are obtained straightforwardly.

TABLE 1

| Connection Path | Connection 1 (H1-H2) | Connection 2 (H1-H3) | ... | Connection C (H5-H6) |
|---|---|---|---|---|
| k = 1 | S1-S2 (links 141-142-143) | S1-S3-S5 | | S7-S8-S6 |
| k = 2 | S1-S3-S2 | S1-S2-S6-S5 | ... | S7-S4-S6 |
| k = 3 | S1-S3-S4-S6-S2 | ... | | ... |
| ... | ... | | | |

The problem is to find a path (out of the k paths) that satisfies certain global criteria. An exhaustive search of the entire K-C space would require checking for $K^C$ possibilities, which is NP (non-polynomial time).

A straightforward approach, as alluded to above, is via a sequential assignment, which simply finds a best path for each of the connections sequentially (for connections 1 to C, in no particular order). However, the sequential approach does not take into account of available information regarding the resource requirement of all the C connections (which is a known quantity), and thus can generate unbalanced loading of the network.

The devised heuristic algorithm, on the other hand, strives to use all the available information to arrive at a feasible global optimum. This is achieved with the use of three important notions in the method steps, namely: (i) a hypothetical network; (ii) an iterative procedure; and (iii) randomization of starting points.

Heuristic VPN Configuration Algorithm

Figure 2:
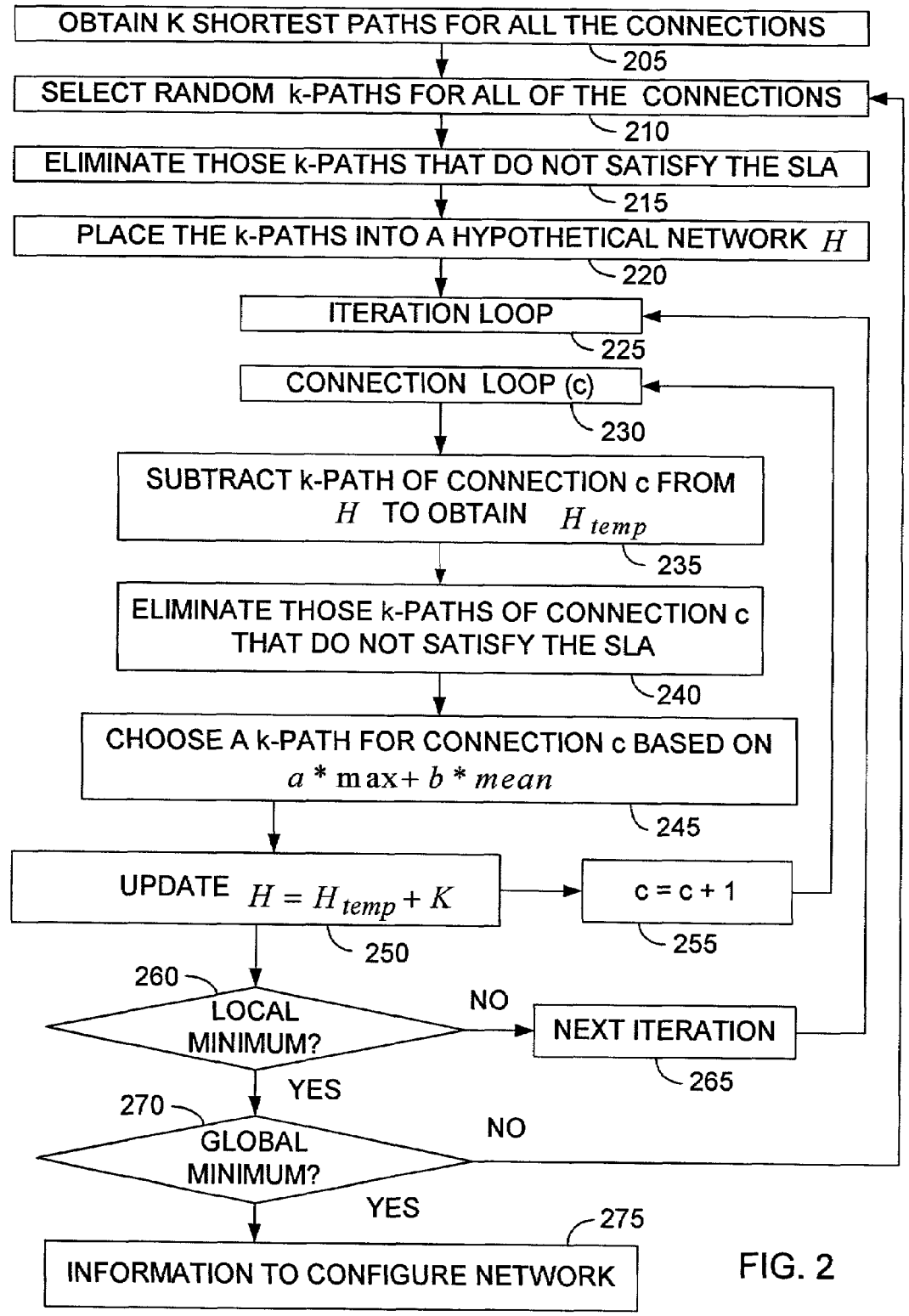
FIG. 2 illustrates the steps of the algorithm to determine the interconnection links of FIG. 1 that configure the network as a VPN subject to the service level agreement.

The steps for the heuristic VPN configuration algorithm are shown in FIG. 2. The algorithm commences with finding a set of k-shortest paths for each of the C connections. The search for this set of k-shortest paths needs to be done only once since shortest paths are a function of the topology of the network and not a function of the state (capacity) of the network.

From this initial set of k-paths, the paths that violate SLAs (such as end-to-end physical delay) are first eliminated. Then, a random set of paths from the remaining k paths is chosen and assigned into a hypothetical network H. At this time, H may not be SLA-enabled.

Next, an iteration process is initiated to re-assign each of the paths of the connections. Every time a new path is reassigned, it is chosen with respect to two criteria:

(a) The path satisfies the SLA requirement or, if none of the k paths satisfy the SLA requirement, the least violator is chosen.

(b) The path that minimizes a given metric, such as, for example {a*max+b*mean}, where "max" is the hop in H that has the maximum capacity, "mean" is the mean of the k-path, and a and b are heuristically determined constants.

If there are conflicts between criteria 1 and 2, criterion 1 should have priority.

The first iteration starts from connection 1 to connection C, and if a local minimum (defined as no change in all the connections) is not attained, the algorithm continues the second iteration and reassigns all the connections again. This is done until a local minimum is found.

A local minimum is generally not a globally optimum solution, unless the search space is a convex. Since there is no reason to assume that the space is convex, multiple searching is performed with different initial set of k-paths. The search may be terminated if either certain pre-defined improvement has been achieved, or if the number of trials has attained a pre-defined limit. In this way, a solution that is produced is much better than a local minimum.

The steps of FIG. 2 are as follows:

Step 205—determining k shortest paths for all the C connections of the VPN

Step 210—commence with random k-paths for all the C connections

Step 215—eliminate those k-paths that do not satisfy SLA requirements

Step 220—place the k-paths into a hypothetical network H
Step 225—start the iteration loop
Step 230—start the connection loop (c)
Step 235—subtract k-path of the connection c from H to obtain $H_{temp}$
Step 240—eliminate those k-paths of connection c that do not satisfy the SLA requirements
Step 245—choose a k-path for connection c based on a*max and b*mean where a and b are heuristically determined constants
Step 250—update $H=H_{temp}+K$
Step 255—continue connection loop
Step 260—after connection loop complete, determine if there is a local minimum
Step 265—if not a local minimum, then continue to next iteration
Step 270—if a local minimum, determine if this is a global minimum; if not a global minimum, then go to step 210
Step 275—if a global minimum, there is sufficient information to configure the network

EXAMPLE

The devised algorithm is exemplified with reference to network 100 of FIG. 1. For SLA, the notion of equivalent bandwidth is applied, which maps packet loss ratio into a bandwidth requirement. In the devised technique, it is assumed that if any one of the links of a path exceeds certain pre-defined number, that particular path will not be used for the current selection. The heuristic algorithm is applied to this reference network for 100 times, each with a different set of VPN demand that ranges from 0.2 to 20 capacity units. K=4 is selected, along with a=9.5 and b=0.5. Table 2 shows the result of running the heuristic VPN planning algorithm for 100 times compared to other known approaches. For each run, the heuristic algorithm is compared with the sequential approach. It is seen that the heuristic approach outperforms the sequential approach almost all the time. For the experiments that the heuristic algorithm does not yield better results, it converges to the same result as the sequential approach.

TABLE 2

|  | Compare to minimum hops | Compare to sequential algorithm |
| --- | --- | --- |
| K = 4; # of trials = 100 |  |  |
| # of times heuristic algorithm performs better | 96 | 35 |
| Heuristic algorithm better by an average of | 9.9 units | 3.8 units |
| K = 3; # of trials = 100 |  |  |
| # of times heuristic algorithm performs better | 95 | 43 |
| Heuristic algorithm better by an average of | 10.8 units | 3.6 units |

Implementation of the VPN Network

Figure 3:
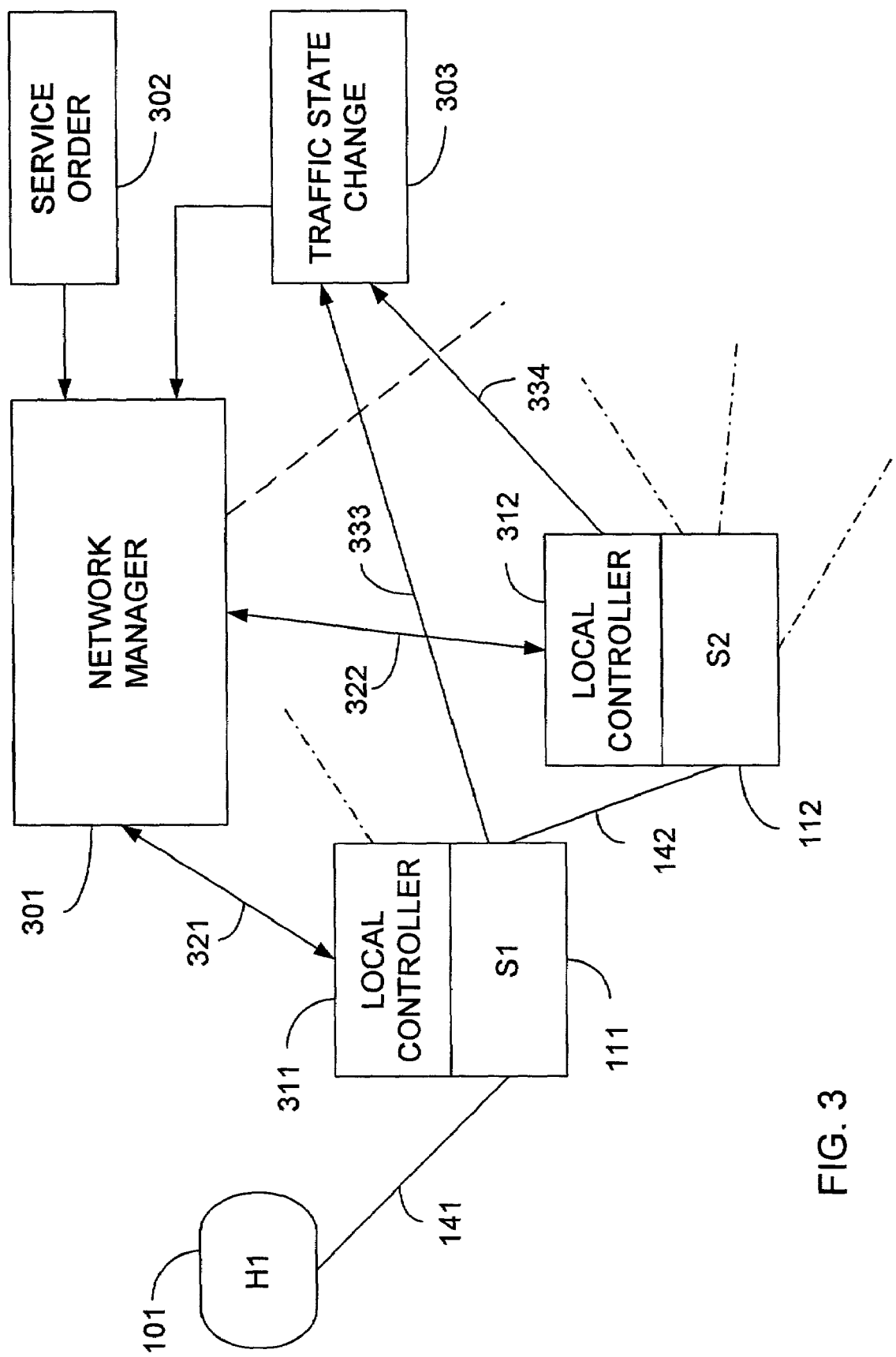
FIG. 3 illustrates the arrangement, including a network manager and local controllers associated with each of the switching nodes of FIG. 1, for conveying VPN configuration information to the switching nodes to configure the VPN.

With reference to FIG. 3, there is shown a high-level block diagram of an augmented portion of FIG. 1 that is considered illustrative of the technique for configuring overall network 100 based upon the heuristic algorithm described above. In FIG. 3, network manger 301 is shown as interacting with local controllers 311 and 312 associated with switching nodes 111 and 112, respectively. Although the local controllers are shown as being appliqúes to nodes 111 and 112 for expository purposes, in practice controllers 311 and 312 are typically integral to nodes 111 and 112. Moreover, network manager 301, although shown as a stand-alone component, may also be co-located with or be any integral part of any one of the nodes. Network manager 301, at a minimum, stores the VPN network set-up/configuration infonnation obtained by the heuristic algorithm in an off-line implementation, or may preferably dynamically compute the network configuration information on a real-time basis— execution of the algorithm typically requires only tens of seconds. All switching nodes of network 100 register with manager 301 via the corresponding ones of the local controllers (e.g., controller 311 of node 111) over conventional low-speed signaling links exemplified by link 32, coupling local controller 311 and link 322 coupling controller 312 with network manager 301. Manager 301 then notifies each of the switching nodes with local configuration information for the links emanating from each switching node that is sufficient to configure each switching node to effect the VPN network. This link configuration information is used to arrange a conventional look-up table in each switching node (e.g., in ATM, the VCI table) to configure the VPN network. As VPN network traffic is routed from one switching node to another, this traffic is forwarded over the corresponding links assigned to carry the traffic for the VPN network.

The process to configure a VPN network for a given customer is commenced by a service order generated from a customer order request, as depicted by service order block 302 in FIG. 3; the service order includes SLA requirements that are passed to network manager 301. In addition, once the VPN network is configured upon execution of the heuristic algorithm and downloading link information to the switching nodes, it is possible to dynamically re-configure the VPN network when necessary, which may due to, for example, link outages. Conventionally, traffic state change data is collected for the network of FIG. 1, of which the VPN network is a subset—the activity of collecting traffic state change data is represented by traffic processing block 303. Data is collected by traffic processing block 303 over conventional low speed links 333 and 334 connecting traffic processing block 303 with local controllers 311 and 312, respectively.

Figure 4:
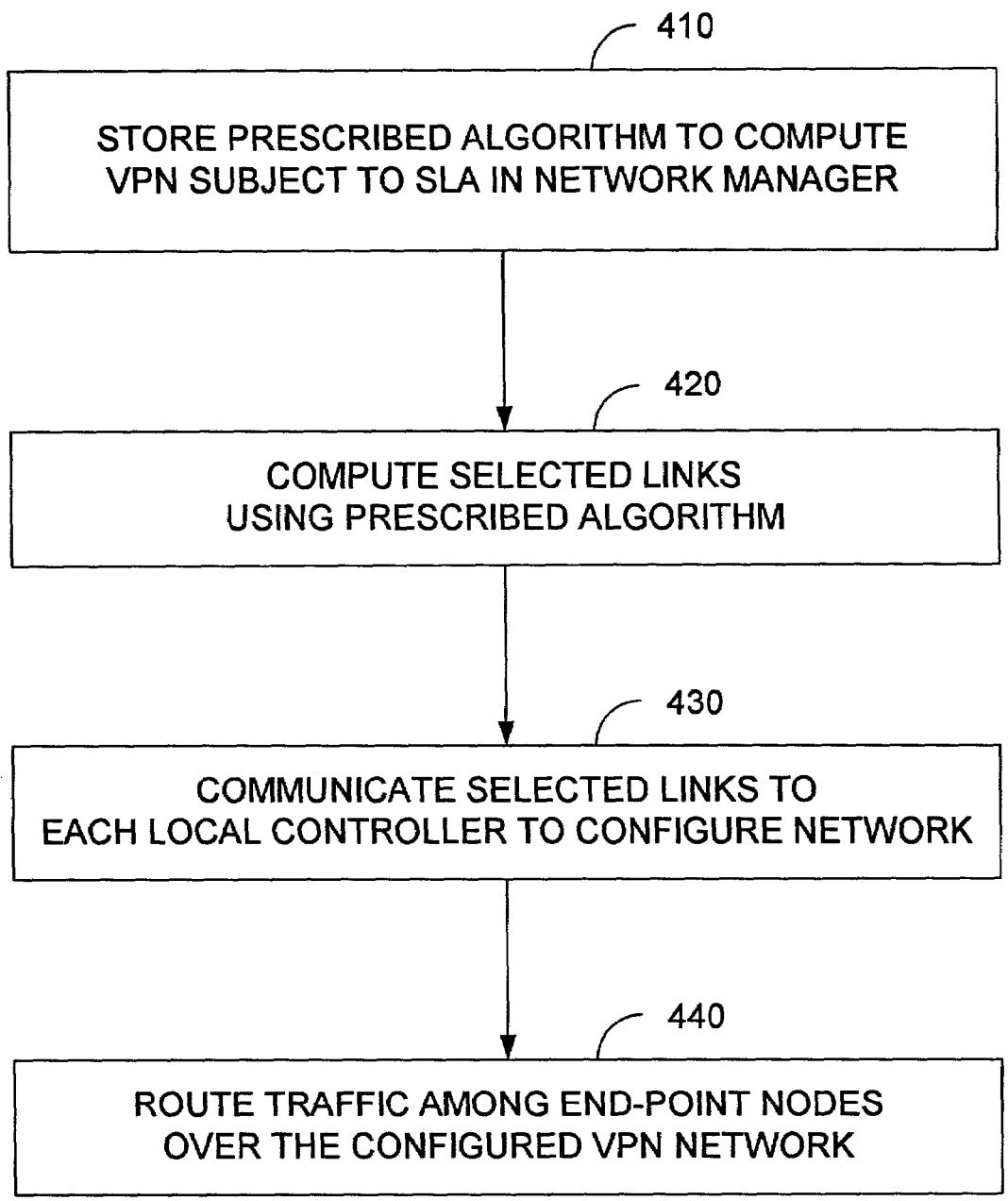
FIG. 4 is a high-level flow diagram of the method carried out by the network manager, in conjunction with each local controller and switching node, to configure the network of FIG. 1 as the VPN subject to the service level agreement.

The flow diagram of FIG. 4 depicts the inventive methodology carried out by the structure of FIG. 3, as alluded to in the foregoing description of FIG. 3. Thus, in one illustrative embodiment, network manager 301 has stored, upon its initialization or by downloading, the prescribed heuristic algorithm (summarized by FIG. 2), as depicted by processing block 410. The algorithm is used to compute, as per processing block 420, the network paths to effect the VPN subject to the SLA constraints. As depicted by processing block 430, once the path set-up is computed, each switching node 111, 112, . . . , via communication between network manager 301 and each associated local controller 311, 312, . . . , is informed of information to thereby configure network 100 as the desired VPN. Upon configuration, as evoked by processing block 440, traffic is routed among VPN end-points 101, . . . , 106 in correspondence to the VPN configuration.

Although the present invention have been shown and described in detail herein, those skilled in the art can readily devise many other varied embodiments that still incorporate these teachings.

What is claimed is:

1. A method for implementing a virtual private network of connections for a given service level agreement using a mathematical algorithm, the connections being implemented by paths between pairs of end-points in the virtual private network and being composed of nodes interconnected by links, there being a plurality of paths for each connection between two end points in the virtual private network including a set of k-shortest paths, the method comprising the steps of;

determining the set of k-shortest paths for each connection, for each connection, randomly selecting a path from that connection's k-shortest paths, iteratively reassigning, based upon a prescribed heuristic mathematical algorithm, the randomly selected paths with other paths from the sets of shortest paths to give a resulting set of paths, the heuristic algorithm being determined to satisfy the requirements of the given service level agreement, the step of iteratively reassigning being consecutively continued until the path for each connection remains unchanged; and establishing the physical connections by interconnecting, for each path of the resulting set, node pairs with corresponding links.

2. The method as recited in claim 1 wherein the heuristic algorithm includes the step of eliminating from all sets of shortest paths those paths that violate the service level agreement to obtain remaining paths.

3. The method of claim 1 wherein the mathematical heuristic algorithm includes the step of determining local minima.

4. The method of claim 3 wherein the mathematical heuristic algorithm includes the step of determining a global minimum from the local minima.

5. The method as recited in claim 1 further comprising selecting at random different sets of initial paths for each connection and iteratively reassigning said different sets of initial paths.

6. The method as recited in claim 5 wherein said step of selecting includes the step of including bandwidth, delay, loss, and jitter as the service level agreement requirements.

7. A method for physically implementing a virtual private network composed of nodes interconnected by links, the method comprising the steps of:

systematically selecting, based upon a prescribed mathematical algorithm, links interconnecting node pairs, the algorithm being determined to satisfy the requirements of a given service level agreement, and interconnecting each node pair with the corresponding selected links, wherein the algorithm includes the steps of (a) determining a set of shortest paths for all connections of the virtual private network, (b) commencing with random k-paths for all the connections, (c) eliminating those k-paths that do not satisfy service level agreement (SLA) requirements.

(d) placing the k-paths into a hypothetical network H, (e) starting an iteration loop, (f) starting a connection loop I, (g) subtracting the k-path of the connection c from H to obtain $H_{temp}$, (h) eliminating those k-paths of connection c that do not satisfy the SLA requirements, (i) choosing a k-path for connection c based a specified metric, (j) updating $H=H_{temp}+K$, where K is pre-specified constant, (k) continuing the connection loop by proceeding to step (f) to complete all connections, (l) after the connection loop is complete, determining if there is a local minimum, (m) if not a local minimum, then continuing to next iteration by proceeding to step (e), (n) if a local minimum, determining if this is a global minimum; if not a global minimum, proceeding to step (b), and (o) if a global minimum, configuring the network based upon link interconnection information.

8. The method as recited in claim 7 wherein the step of choosing a k-path for connection c based on a specified metric includes the step of specifying the metric as {a*max+ b* mean}, where "max" is the hop in H that has the maximum capacity, and "mean" is the mean of the k-path and a and b are heuristically determined constants.

9. The method as recited in claim 8 wherein a is 9.5 and b is 0.5.

* * * * *